US008849991B2

(12) United States Patent
Levy et al.

(10) Patent No.: US 8,849,991 B2
(45) Date of Patent: Sep. 30, 2014

(54) SYSTEM AND METHOD FOR HYPERTEXT TRANSFER PROTOCOL LAYERED RECONSTRUCTION

(75) Inventors: Joseph H. Levy, Eagle Mountain, UT (US); Matthew Scott Wood, Salt Lake City, UT (US); Daniel Arnold, Riverton, UT (US); Kenny Foisy, American Fork, UT (US); Dave Tubbs, Sandy, UT (US)

(73) Assignee: Blue Coat Systems, Inc., Sunnyvale, CA (US)

( * ) Notice: Subject to any disclaimer, the term of this patent is extended or adjusted under 35 U.S.C. 154(b) by 232 days.

(21) Appl. No.: 12/968,453

(22) Filed: Dec. 15, 2010
(Under 37 CFR 1.47)

(65) Prior Publication Data

US 2012/0158737 A1    Jun. 21, 2012

(51) Int. Cl.
*G06F 15/173* (2006.01)
*H04L 12/26* (2006.01)
*G06F 17/30* (2006.01)

(52) U.S. Cl.
CPC .......... *G06F 17/30902* (2013.01); *H04L 43/18* (2013.01)
USPC ............................ 709/224; 709/233; 709/230

(58) Field of Classification Search
CPC ... H04L 43/106; H04L 43/06; H04L 63/1408; H04L 63/1425
USPC .............. 726/23, 13, 224, 26, 2, 12; 709/224, 709/227, 219, 217, 230, 223, 203, 225, 226, 709/229; 370/389, 352, 255, 252; 345/506, 345/419

See application file for complete search history.

(56) References Cited

U.S. PATENT DOCUMENTS

| | | | |
|---|---|---|---|
| 5,274,643 | A | 12/1993 | Fisk |
| 5,440,719 | A | 8/1995 | Hanes et al. |
| 5,526,283 | A | 6/1996 | Hershey et al. |
| 5,602,830 | A | 2/1997 | Fichou et al. |
| 5,758,178 | A | 5/1998 | Lesartre |
| 6,041,053 | A | 3/2000 | Douceur et al. |
| 6,101,543 | A | 8/2000 | Alden et al. |
| 6,145,108 | A | 11/2000 | Ketseoglou |
| 6,185,568 | B1 | 2/2001 | Douceur et al. |
| 6,336,117 | B1 | 1/2002 | Massarani |
| 6,370,622 | B1 | 4/2002 | Chiou et al. |
| 6,400,681 | B1 | 6/2002 | Bertin et al. |
| 6,453,345 | B2 | 9/2002 | Trcka et al. |
| 6,516,380 | B2 | 2/2003 | Kenchammana-Hoskote et al. |
| 6,522,629 | B1 | 2/2003 | Anderson, Sr. |
| 6,591,299 | B2 | 7/2003 | Riddle et al. |
| 6,628,617 | B1 | 9/2003 | Karol et al. |

(Continued)

*Primary Examiner* — David Lazaro
*Assistant Examiner* — Charles Murphy
(74) *Attorney, Agent, or Firm* — Cooley LLP

(57) ABSTRACT

HTTP layered reconstruction is disclosed. A database is queried to identify a location of a previously reconstructed HTML artifact file or packet data of a HTML file in a repository that stores packet data captured from a network. The reconstructed HTML file is analyzed. Links to external files are identified and the database is queried to identify a location of previously reconstructed artifact files or packet data of associated external files. The external files are reconstructed, as needed. A web page is then reconstructed based on the reconstructed HTML file and reconstructed external files, presenting a view of the web page as it originally appeared to a user. A user may specify which external file types to include and/or not include. New versions of external files may be obtained and indicated in the reconstructed web page when associated artifact files or packet data are not stored within the repository.

12 Claims, 11 Drawing Sheets

(56) References Cited

U.S. PATENT DOCUMENTS

| | | |
|---|---|---|
| 6,628,652 B1 | 9/2003 | Chrin et al. |
| 6,675,218 B1 | 1/2004 | Mahler et al. |
| 6,693,909 B1 | 2/2004 | Mo et al. |
| 6,708,292 B1 | 3/2004 | Mangasarian |
| 6,754,202 B1 | 6/2004 | Sun et al. |
| 6,782,444 B1 | 8/2004 | Vishlitzky et al. |
| 6,789,125 B1 | 9/2004 | Aviani et al. |
| 6,907,468 B1 | 6/2005 | Moberg et al. |
| 6,907,520 B2 | 6/2005 | Parady |
| 6,928,471 B2 | 8/2005 | Pabari et al. |
| 6,956,820 B2 | 10/2005 | Zhu et al. |
| 6,958,998 B2 | 10/2005 | Shorey |
| 6,993,037 B2 | 1/2006 | Boden et al. |
| 6,999,454 B1 | 2/2006 | Crump |
| 7,002,926 B1 | 2/2006 | Eneboe et al. |
| 7,024,609 B2 | 4/2006 | Wolfgang et al. |
| 7,028,335 B1 | 4/2006 | Borella et al. |
| 7,032,242 B1 | 4/2006 | Grabelsky et al. |
| 7,039,018 B2 | 5/2006 | Singh et al. |
| 7,047,297 B2 | 5/2006 | Huntington et al. |
| 7,058,015 B1 | 6/2006 | Wetherall et al. |
| 7,061,874 B2 | 6/2006 | Merugu et al. |
| 7,065,482 B2 | 6/2006 | Shorey et al. |
| 7,072,296 B2 | 7/2006 | Turner et al. |
| 7,075,927 B2 | 7/2006 | Mo et al. |
| 7,116,643 B2 | 10/2006 | Huang et al. |
| 7,126,944 B2 | 10/2006 | Rangarajan et al. |
| 7,126,954 B2 | 10/2006 | Fang et al. |
| 7,142,507 B1 | 11/2006 | Kurimoto et al. |
| 7,145,906 B2 | 12/2006 | Fenner |
| 7,151,751 B2 | 12/2006 | Tagami et al. |
| 7,154,896 B1 | 12/2006 | Kim et al. |
| 7,162,649 B1 | 1/2007 | Ide et al. |
| 7,168,078 B2 | 1/2007 | Bar et al. |
| 7,200,122 B2 | 4/2007 | Goringe et al. |
| 7,203,173 B2 | 4/2007 | Bonney et al. |
| 7,218,632 B1 | 5/2007 | Bechtolsheim et al. |
| 7,237,264 B1 | 6/2007 | Graham et al. |
| 7,240,166 B2 | 7/2007 | Ganfield |
| 7,254,562 B2 | 8/2007 | Hsu et al. |
| 7,269,171 B2 | 9/2007 | Poon et al. |
| 7,274,691 B2 | 9/2007 | Rogers et al. |
| 7,277,399 B1 | 10/2007 | Hughes, Jr. |
| 7,283,478 B2 | 10/2007 | Barsheshet et al. |
| 7,292,591 B2 | 11/2007 | Parker et al. |
| 7,330,888 B2 | 2/2008 | Storry et al. |
| 7,340,776 B2 | 3/2008 | Zobel et al. |
| 7,359,930 B2 | 4/2008 | Jackson et al. |
| 7,376,731 B2 | 5/2008 | Khan et al. |
| 7,376,969 B1 | 5/2008 | Njemanze et al. |
| 7,379,426 B2 | 5/2008 | Sekiguchi |
| 7,385,924 B1 | 6/2008 | Riddle |
| 7,386,473 B2 | 6/2008 | Blumenau |
| 7,391,769 B2 | 6/2008 | Rajkumar et al. |
| 7,406,516 B2 | 7/2008 | Davis et al. |
| 7,408,938 B1 | 8/2008 | Chou et al. |
| 7,418,006 B2 | 8/2008 | Damphier et al. |
| 7,420,992 B1 | 9/2008 | Fang et al. |
| 7,423,979 B2 | 9/2008 | Martin |
| 7,433,326 B2 | 10/2008 | Desai et al. |
| 7,440,464 B2 | 10/2008 | Kovacs |
| 7,441,267 B1 | 10/2008 | Elliott |
| 7,444,679 B2 | 10/2008 | Tarquini et al. |
| 7,450,560 B1 | 11/2008 | Grabelsky et al. |
| 7,450,937 B1 | 11/2008 | Claudatos et al. |
| 7,453,804 B1 | 11/2008 | Feroz et al. |
| 7,457,277 B1 | 11/2008 | Sharma et al. |
| 7,457,296 B2 | 11/2008 | Kounavis et al. |
| 7,457,870 B1 | 11/2008 | Lownsbrough et al. |
| 7,466,694 B2 | 12/2008 | Xu et al. |
| 7,467,202 B2 | 12/2008 | Savchuk |
| 7,480,238 B2 | 1/2009 | Funk et al. |
| 7,480,255 B2 | 1/2009 | Bettink |
| 7,483,424 B2 | 1/2009 | Jain et al. |
| 7,489,635 B2 | 2/2009 | Evans et al. |
| 7,493,654 B2 | 2/2009 | Bantz et al. |
| 7,496,036 B2 | 2/2009 | Olshefski |
| 7,496,097 B2 | 2/2009 | Rao et al. |
| 7,499,590 B2 | 3/2009 | Seeber |
| 7,508,764 B2 | 3/2009 | Back et al. |
| 7,512,078 B2 | 3/2009 | Swain et al. |
| 7,512,081 B2 | 3/2009 | Ayyagari et al. |
| 7,522,521 B2 | 4/2009 | Bettink et al. |
| 7,522,594 B2 | 4/2009 | Piche et al. |
| 7,522,599 B1 | 4/2009 | Aggarwal et al. |
| 7,522,604 B2 | 4/2009 | Hussain et al. |
| 7,522,605 B2 | 4/2009 | Spencer et al. |
| 7,522,613 B2 | 4/2009 | Rotsten et al. |
| 7,525,910 B2 | 4/2009 | Wen |
| 7,525,963 B2 | 4/2009 | Su et al. |
| 7,526,795 B2 | 4/2009 | Rollins |
| 7,529,196 B2 | 5/2009 | Basu et al. |
| 7,529,242 B1 | 5/2009 | Lyle |
| 7,529,276 B1 | 5/2009 | Ramakrishnan |
| 7,529,932 B1 | 5/2009 | Haustein et al. |
| 7,529,939 B2 | 5/2009 | Bruwer |
| 7,532,623 B2 | 5/2009 | Rosenzweig et al. |
| 7,532,624 B2 | 5/2009 | Ikegami et al. |
| 7,532,633 B2 | 5/2009 | Rijsman |
| 7,532,726 B2 | 5/2009 | Fukuoka et al. |
| 7,533,256 B2 | 5/2009 | Walter et al. |
| 7,533,267 B2 | 5/2009 | Yoshimura |
| 7,548,562 B2 | 6/2009 | Ward et al. |
| 7,561,569 B2 | 7/2009 | Thiede |
| 7,617,314 B1 | 11/2009 | Bansod et al. |
| 7,684,347 B2 | 3/2010 | Merkey et al. |
| 7,694,022 B2 | 4/2010 | Garms et al. |
| 7,730,011 B1 | 6/2010 | Deninger et al. |
| 7,792,818 B2 | 9/2010 | Fain et al. |
| 7,853,564 B2 | 12/2010 | Mierau et al. |
| 7,855,974 B2 | 12/2010 | Merkey et al. |
| 7,881,291 B2 | 2/2011 | Grah |
| 7,904,726 B2 | 3/2011 | Elgezabal |
| 8,068,431 B2 | 11/2011 | Varadarajan et al. |
| 2001/0039579 A1 | 11/2001 | Trcka et al. |
| 2002/0085507 A1 | 7/2002 | Ku et al. |
| 2002/0089937 A1 | 7/2002 | Venkatachary et al. |
| 2002/0091915 A1 | 7/2002 | Parady |
| 2002/0138654 A1 | 9/2002 | Liu et al. |
| 2002/0163913 A1 | 11/2002 | Oh |
| 2002/0173857 A1 | 11/2002 | Pabari et al. |
| 2002/0191549 A1 | 12/2002 | McKinley et al. |
| 2003/0009718 A1 | 1/2003 | Wolfgang et al. |
| 2003/0014517 A1 | 1/2003 | Lindsay et al. |
| 2003/0028662 A1* | 2/2003 | Rowley et al. ............... 709/231 |
| 2003/0088788 A1 | 5/2003 | Yang |
| 2003/0135525 A1 | 7/2003 | Huntington |
| 2003/0135612 A1* | 7/2003 | Huntington et al. ......... 709/224 |
| 2003/0188106 A1 | 10/2003 | Cohen |
| 2003/0214913 A1 | 11/2003 | Kan et al. |
| 2003/0221003 A1 | 11/2003 | Storry et al. |
| 2003/0231632 A1 | 12/2003 | Haeberlen |
| 2003/0233455 A1 | 12/2003 | Leber et al. |
| 2004/0010473 A1 | 1/2004 | Hsu et al. |
| 2004/0078292 A1 | 4/2004 | Blumenau |
| 2004/0100952 A1 | 5/2004 | Boucher et al. |
| 2004/0103211 A1 | 5/2004 | Jackson et al. |
| 2004/0218631 A1 | 11/2004 | Ganfield |
| 2004/0260682 A1 | 12/2004 | Herley et al. |
| 2005/0015547 A1 | 1/2005 | Yokohata et al. |
| 2005/0050028 A1 | 3/2005 | Rose et al. |
| 2005/0055399 A1 | 3/2005 | Savchuk |
| 2005/0063320 A1 | 3/2005 | Klotz et al. |
| 2005/0083844 A1 | 4/2005 | Zhu et al. |
| 2005/0108573 A1 | 5/2005 | Bennett et al. |
| 2005/0117513 A1 | 6/2005 | Park et al. |
| 2005/0132046 A1 | 6/2005 | de la Iglesia et al. |
| 2005/0132079 A1* | 6/2005 | Iglesia et al. ............... 709/230 |
| 2005/0207412 A1 | 9/2005 | Kawashima et al. |
| 2005/0229255 A1 | 10/2005 | Gula et al. |
| 2005/0249125 A1 | 11/2005 | Yoon et al. |
| 2005/0265248 A1 | 12/2005 | Gallatin et al. |
| 2006/0013222 A1 | 1/2006 | Rangan et al. |
| 2006/0037072 A1 | 2/2006 | Rao et al. |

(56) References Cited

U.S. PATENT DOCUMENTS

| | | |
|---|---|---|
| 2006/0069821 A1 | 3/2006 | P et al. |
| 2006/0083180 A1 | 4/2006 | Baba et al. |
| 2006/0088040 A1 | 4/2006 | Kramer et al. |
| 2006/0114842 A1 | 6/2006 | Miyamoto et al. |
| 2006/0126665 A1 | 6/2006 | Ward et al. |
| 2006/0146816 A1 | 7/2006 | Jain |
| 2006/0165009 A1 | 7/2006 | Nguyen et al. |
| 2006/0165052 A1 | 7/2006 | Dini et al. |
| 2006/0167894 A1 | 7/2006 | Wunner |
| 2006/0168240 A1 | 7/2006 | Olshefski |
| 2006/0203848 A1 | 9/2006 | Damphier et al. |
| 2006/0221967 A1 | 10/2006 | Narayan et al. |
| 2006/0233118 A1 | 10/2006 | Funk et al. |
| 2006/0235908 A1 | 10/2006 | Armangau et al. |
| 2007/0019640 A1 | 1/2007 | Thiede |
| 2007/0036156 A1 | 2/2007 | Liu et al. |
| 2007/0038665 A1 | 2/2007 | Kwak et al. |
| 2007/0050334 A1 | 3/2007 | Deninger et al. |
| 2007/0050465 A1 | 3/2007 | Canter et al. |
| 2007/0058631 A1 | 3/2007 | Mortier et al. |
| 2007/0124276 A1 | 5/2007 | Weissman et al. |
| 2007/0139231 A1 | 6/2007 | Wallia et al. |
| 2007/0140235 A1 | 6/2007 | Aysan et al. |
| 2007/0140295 A1 | 6/2007 | Akaboshi |
| 2007/0147263 A1 | 6/2007 | Liao et al. |
| 2007/0153796 A1 | 7/2007 | Kesavan et al. |
| 2007/0157306 A1 | 7/2007 | Elrod et al. |
| 2007/0162609 A1 | 7/2007 | Pope et al. |
| 2007/0162971 A1 | 7/2007 | Blom et al. |
| 2007/0223474 A1 | 9/2007 | Shankar |
| 2007/0248029 A1 | 10/2007 | Merkey et al. |
| 2007/0250817 A1 | 10/2007 | Boney |
| 2007/0271372 A1 | 11/2007 | Deninger et al. |
| 2007/0286175 A1 | 12/2007 | Xu et al. |
| 2007/0291755 A1 | 12/2007 | Cheng et al. |
| 2007/0291757 A1 | 12/2007 | Dobson et al. |
| 2007/0297349 A1 | 12/2007 | Arkin |
| 2008/0013541 A1 | 1/2008 | Calvignac et al. |
| 2008/0037539 A1 | 2/2008 | Paramaguru |
| 2008/0056144 A1 | 3/2008 | Hutchinson et al. |
| 2008/0117903 A1 | 5/2008 | Uysal |
| 2008/0159146 A1 | 7/2008 | Claudatos et al. |
| 2008/0175167 A1 | 7/2008 | Satyanarayanan et al. |
| 2008/0181245 A1 | 7/2008 | Basso et al. |
| 2008/0240128 A1 | 10/2008 | Elrod |
| 2008/0247313 A1 | 10/2008 | Nath et al. |
| 2008/0279216 A1 | 11/2008 | Sharif-Ahmadi et al. |
| 2008/0294647 A1 | 11/2008 | Ramaswamy |
| 2009/0003363 A1 | 1/2009 | Benco et al. |
| 2009/0006672 A1 | 1/2009 | Blumrich et al. |
| 2009/0028161 A1 | 1/2009 | Fullarton et al. |
| 2009/0028169 A1 | 1/2009 | Bear et al. |
| 2009/0041039 A1 | 2/2009 | Bear et al. |
| 2009/0073895 A1 | 3/2009 | Morgan et al. |
| 2009/0092057 A1 | 4/2009 | Doctor et al. |
| 2009/0097417 A1 | 4/2009 | Asati et al. |
| 2009/0097418 A1 | 4/2009 | Castillo et al. |
| 2009/0103531 A1 | 4/2009 | Katis et al. |
| 2009/0109875 A1 | 4/2009 | Kaneda et al. |
| 2009/0113217 A1 | 4/2009 | Dolgunov et al. |
| 2009/0116403 A1 | 5/2009 | Callanan et al. |
| 2009/0116470 A1 | 5/2009 | Berggren |
| 2009/0119501 A1 | 5/2009 | Petersen |
| 2009/0122801 A1 | 5/2009 | Chang |
| 2009/0168648 A1 | 7/2009 | Labovitz et al. |
| 2009/0182953 A1 | 7/2009 | Merkey et al. |
| 2009/0187558 A1 | 7/2009 | McDonald |
| 2009/0219829 A1 | 9/2009 | Merkey et al. |
| 2009/0245114 A1 | 10/2009 | Vijayaraghavan |
| 2009/0290580 A1 | 11/2009 | Wood et al. |
| 2009/0292681 A1 | 11/2009 | Wood et al. |
| 2010/0278052 A1 | 11/2010 | Matityahu et al. |

* cited by examiner

SYSTEM AND METHOD FOR HYPERTEXT TRANSFER PROTOCOL LAYERED RECONSTRUCTION

FIELD OF TECHNOLOGY

This disclosure relates generally to the technical field of network forensics, and in particular to systems and methods for layered reconstruction of a web page, as the web page was experienced or perceived by a user.

BACKGROUND

The field of deep packet inspection involves, among other things, various different possible methods of discovering and analyzing the contents of packetized data being transmitted over a network. Packetized network data may be captured, stored in a packet capture repository and indexed in a database by content analysis and inspection of various network characteristics. Subsequently, artifacts may be extracted from the stored network packet data by identifying and aggregating the payloads of the identified network packet data. Such artifacts may include various files such as images, word processing documents, spreadsheets, video files, emails, instant messages, audio files, presentations, executables, and/or other files that were previously transmitted over the network in packetized form.

Analysis of network packet data stored in the packet capture repository utilizing the indexed database may not provide enough information for full forensic analysis. Traffic information may indicate that a file was transferred, but may not yield certain information about the contents of that file. Extraction of artifacts from the network packet data stored in the packet capture repository may provide additional information for network forensics. However, even extraction of an individual artifact may not provide sufficient information regarding the larger context in which the individual artifact was transmitted across the network in packetized form.

SUMMARY

Systems and methods for hypertext transfer protocol layered reconstruction are disclosed. A database may be queried to identify locations of either packet data of a HTML (hypertext markup language) file in a repository that stores network packet data captured from one or more networks or a previously reconstructed artifact of the HTML file. The database may be indexed using content analysis and inspection of the network packet data to point to locations in the repository according to various network characteristics of the network packet data such as artifact types, protocol types, IP addresses, TCP ports, time stamps, and so on. The HTML file may be reconstructed from the identified packet data and analyzed. Links to external files in the HTML file may be identified and the database may be queried to identify either locations of external file packet data of associated external files in the repository or locations of previously reconstructed artifacts of the external files. The external files may be reconstructed from the identified external file packet data. The HTML file may then be transformed so that the links and references to component elements point to the locally reconstructed files. A web page may then be reconstructed based on the reconstructed HTML file and reconstructed and transformed external files, presenting a view of the web page as it appeared to a user when the packet data was originally captured.

In various implementations, a user may be able to specify which external file types to include in reconstructing the web page and/or which external file types not to include, such as style sheets, script elements, image files, media content, etc. In such implementations, reconstruction of the web page may not be based on reconstruction one or more external files that the user specifies not to include.

In some implementations, live versions of external files may be retrieved from origin servers and utilized in reconstructing the web page. Whether live versions of such files are obtained as part of reconstructing the web page may be based on input received from a user. In such implementations, the reconstructed web page may include visual indicators indicating which external files are newly obtained. Such visual indicators may be included in the reconstructed web site based on user input.

The systems and methods disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which.

Figure 1:
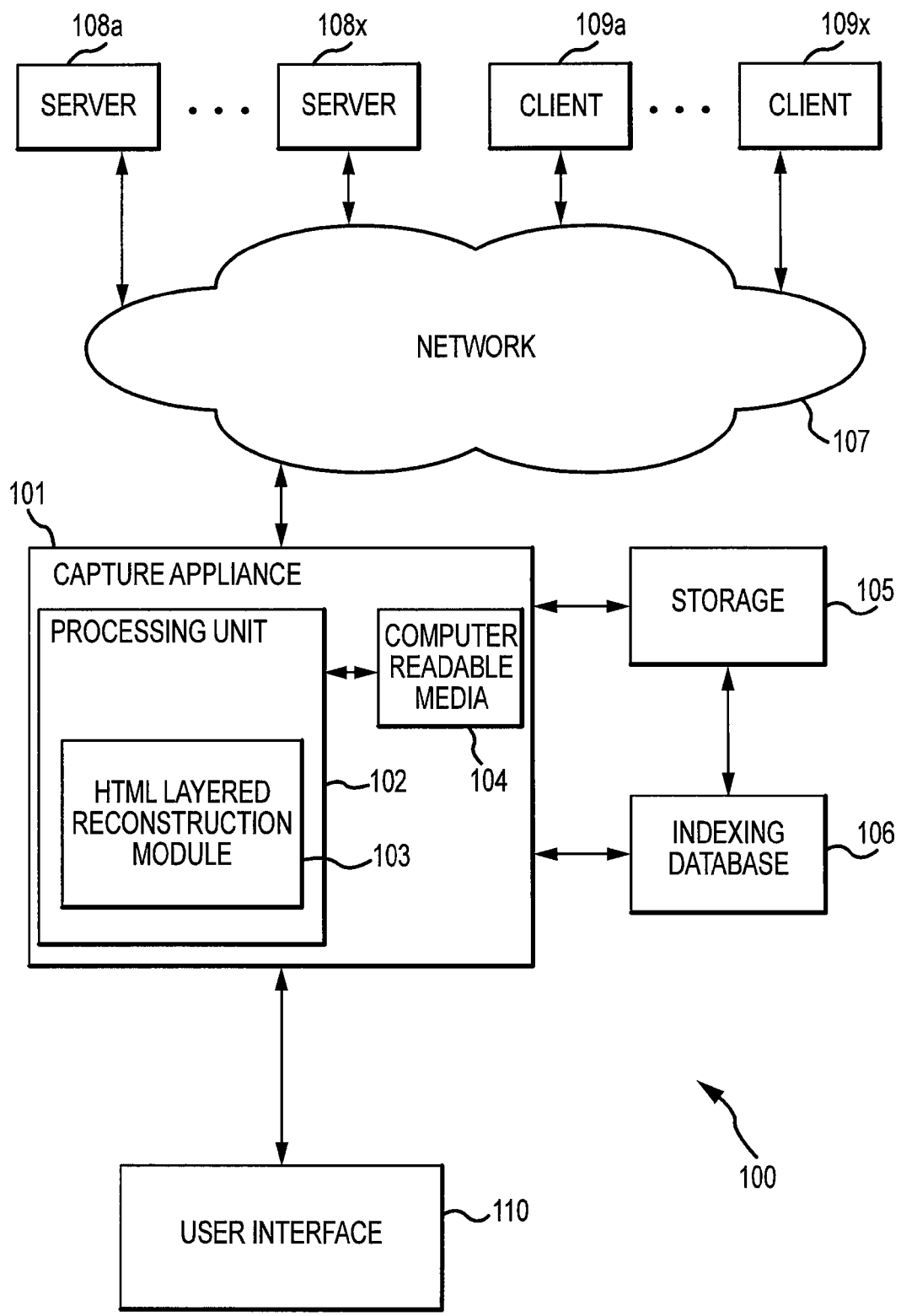
FIG. 1 is a block diagram of a sample system for hypertext transfer protocol layered reconstruction.

Other features of the present embodiments will be apparent from the accompanying drawings and from the disclosure that follows.

DETAILED DESCRIPTION

In the following description, for the purposes of explanation, numerous specific details are set forth in order to provide a thorough understanding of the various embodiments. It may be evident, however, to one skilled in the art that the various embodiments may be practiced without these specific details.

Web pages, as they are experienced by users, are not generally produced by rendering a single file obtained from a single source on a network. Instead, web pages may be produced by rendering many, perhaps hundreds or more, different files from different sources. For example, a web page may include a HTML file obtained from a server. The HTML file may include one or more links to one or more other external files such as image files, script files, style sheet files, and video files. Each of the files associated with the one or more links may reside on one or more servers, which may or may not be the same server from which the HTML file was obtained.

When a user requests a web page utilizing a web browser, the web browser generally requests and obtains the HTML file from the appropriate server. The web browser parses the obtained HTML file, requests additional files referenced by links in the HTML file (if any), renders the received files to assemble the web page and presents the assembled web page to the user. Some of the files may be retrieved from a local cache if they have been previously obtained. The web browser may utilize the cached versions of the files to assemble the web page rather than obtaining the files from the locations referenced by the links.

This process may not be completely linear. For example, the web browser may present a partially assembled web page to the user before all files are requested and/or received. The web browser may present such a partially assembled web page to a user because requesting and obtaining different kinds of files from different sources may require different amounts of time, even if all requested files in fact are available for the web browser to eventually receive. The partially assembled web page presented to the user may be updated by the web browser as additional requested files are received.

Thus, due to the multi-file nature of web pages, extraction of any individual artifact from captured packet data may not provide a complete view of a web page that was obtained and viewed by a user over a network. An administrator or other such authority may need to view an entire web page as it was accessed by a user of a network for a variety of reasons. For example, the administrator may need to determine whether activities such as hacking, violation of company policies, violation of laws, and so on occurred and/or analyze such activities. The administrator may not have enough information to determine whether such activities occurred, or analyze such activities, if the administrator is only able to reconstruct the HTML file from the web page without the related other files, or if the administrator is only able to reconstruct related files. The administrator may be able to access the web page as it currently exists by retrieving it from the server that originally served the HTML file, but the web page and/or the related files may have changed since the web page was originally accessed by the user. As such, the administrator may still be unable to replicate the entire web page as it was viewed by the user.

Further, the administrator may wish to exclude certain types of files when reconstructing the web page as it was viewed by a user. This may not yield as complete a view of the web page as it was originally experienced by a user, but the administrator may wish to avoid potential network damage from malicious code believed to be present in image files, movie files, scripts, style sheets, and so on. Thus, the administrator may need to reconstruct the web page including some of the related files but not others. The administrator may require the capability to individually specify whether image file types, movie file types, script file types, style sheet types, and so on are included in the reconstruction of the web page.

FIG. 1 illustrates a system 100 for HTTP (hypertext transfer protocol) layered reconstruction. The system includes any number of server computing devices 108a-108x operable to communicate with any number of client computing devices 109a-109x via a network 107. The server computing devices and client computing devices may include any kind of computing device such as desktop computers, laptop computers, workstation computers, tablet computers personal digital assistants, cellular telephones, and so on. In response to a client device request, the server computing devices may provide data that is packetized according to a variety of different protocols (such as hypertext transfer protocol, file transfer protocol, Internet Protocol version 4, Internet Protocol version 6, transmission control protocol, user datagram protocol, server message block, simple mail transfer protocol, and so on). This data may be transmitted over the network as part of providing the data or services, requesting the data or services, and so on.

Although FIG. 1 illustrates the server computing devices and client computing devices as separate devices, a particular computing device may act as a client in certain transactions and a server in other transactions. Further, although the network is illustrated as a single network connecting all of the server computing devices and client computing devices, the network may be composed of multiple local area networks, metropolitan area networks, wide area networks (such as the Internet), virtual private networks, and so on of various kinds (wired, wireless, Ethernet, gigabit Ethernet, twisted pair, fiber optic, coaxial, cellular, and so on) which are connected via various kinds of switches, hubs, gateways, and so forth.

The system 100 also includes a capture appliance 101 communicably coupled to the storage 105 and the indexing database 106. The capture appliance 101 may include at least one processing unit 102 and one or more computer readable media 104 (such as random access memories, hard disks, flash memory, cache memory, non-volatile memory, optical storage media, and so on). The capture appliance 101 may be operable to capture, aggregate, annotate, store, and index network packet data from one or more portions of the network 107 and retrieve such data utilizing the storage and the indexing database. Thus, the storage may be operable as a packet capture repository and the indexing database may be operable as an index into the packet capture repository. The storage may include any kind of storage media (such as one or more magnetic storage media, optical storage media, volatile memory, non-volatile memory, flash memory, and so on) configured as a RAID implementation, a storage area network, and so on.

The capture appliance 101 may be a dedicated device in some implementations. In other implementations, the capture appliance 101 may be software operating in a virtualized environment implemented by the processing unit 102 executing one or more instructions stored in the computer readable media 104.

In one or more implementations, the capture appliance 101 may be operable to capture, aggregate, annotate, store, and index network packet data and retrieve such data utilizing various techniques described in: published PCT application PCT/US2005/045566 titled "Method and Apparatus for Network Packet Capture Distributed Storage System" (WO 2006/071560), published U.S. application Ser. No. 12/126,656 titled "Method and Apparatus to Index Network Traffic Meta-Data" (US 2009/0290492), published U.S. application Ser. No. 12/126,551 titled "Method and Apparatus of network Artifact Identification and Extraction" (US 2009/0290580), published U.S. application Ser. No. 12/471,433 titled "Presentation of An Extracted Artifact Based on an Indexing Technique" (US 2009/0292681), and published U.S. application Ser. No. 12/126,619 titled "On Demand Network Activity Reporting Through a Dynamic File System and Method" (US 2009/0292736), all of which are herein incorporated by reference in their entirety.

The capture appliance 101 may capture network packet data from one or more portions the network 107 invisibly to users of the network, such as via one or more transmission media splitters, switched port analyzer ports, mirrored hub or switch ports, and so on. The network packet data may be captured without implementing one or more of the protocol stacks associated with the network packet data. As streams of network packet data are received, the capture appliance 101 may merge these streams, transfer the network packet data and aggregate it in slot buffers in the computer readable media 104 utilizing DMA (direct memory access) techniques, such as copyless DMA. As slot buffers fill, the slots may be transferred to the packet capture repository, again utilizing DMA techniques. At the same time, utilizing shared memory techniques, the network packet data may be indexed and annotated based on various network characteristics, such as annotation with time stamps, packet header attributes, and metadata of the network packet data. Based on the above operations, the capture appliance may be able to capture the full packet traffic across one or more portions of the network, and even high traffic network paths such as 10 gigabit per second traffic and beyond.

The network packet data stored in the packet capture repository may have a variety of possible attributes as well as include a variety of payload data content. Packet header attributes may include source and destination Ethernet addresses (e.g., media access control (MAC) addresses), source and destination Internet Protocol addresses (IPv4, IPv6), source and destination ports (UDP, TCP traffic), packet lengths, virtual local area network (VLAN) identifications, protocol types, and a host of other possible information provided in a header or other packet area. The protocol type associated with the network packet data may include a hypertext transfer protocol (HTTP), a simple mail transfer protocol (SMTP), a remote procedure call (RPC) protocol, voice over internet protocol (VoIP), a peer to peer protocol, a file transfer protocol (FTP), a streaming media protocol, an instant messaging protocol, and so on. The network packet data stored in the packet capture repository may include artifact types, applications, protocol types, user-definable attributes, times stamps, and so on.

In various implementations, header attributes, flow attributes, and content types of the network packet data are identified in the packets contemporaneously with storage in the packet capture repository, and the header attributes, flow attributes, and content types are stored in discrete database units or otherwise in the indexing database 106. Each discrete header attribute and content type may be stored in a sequence matching that of the packet capture repository. Hence, the database units provide an index for the packet capture repository.

The capture appliance 101 may query the network packet data of the packet capture repository for some artifact (e.g., data packets of interest that flowed over the network and, when taken together, may be used to reconstruct a single file), query the indexing database 106 for previously reconstructed artifacts, present network packet data from the packet capture repository via a virtual file system, replay network packet data from the packet capture repository via a virtual network interface, generate various reports concerning network packet data from the packet capture repository, and so on.

The indexing database 106 may include a collection of meta-data that is stored in an organized manner so that the network packet data may be accessed efficiently through a query. The information (e.g., packet data, meta-data, etc.) may be extracted from the indexing database through a suitable database query. The database query may be performed through any number of interfaces including a graphical user interface, a web services request, a programmatic request, a structured query language (SQL), and so on, used to extract related information of a packet data or any meta-data stored in the indexing database. If a query is matched to certain data stored in the indexing database, then matched packets may be retrieved from the packet capture repository for reconstruction. The matched packet data may be reconstructed by referring to a location in the packet capture repository corresponding to designated packet data.

The capture appliance 101 may further include or implement a HTML layered reconstruction module 103. The HTML layered reconstruction module may be implemented by the processing unit 102 loading and executing one or more instructions from a computer readable media, such as the computer readable media 104. The HTML layered reconstruction module may be operable to reconstruct a web page as it was viewed by a user of the network 107 based on network packet data in the packet capture repository utilizing the indexing database 106.

Figure 2:
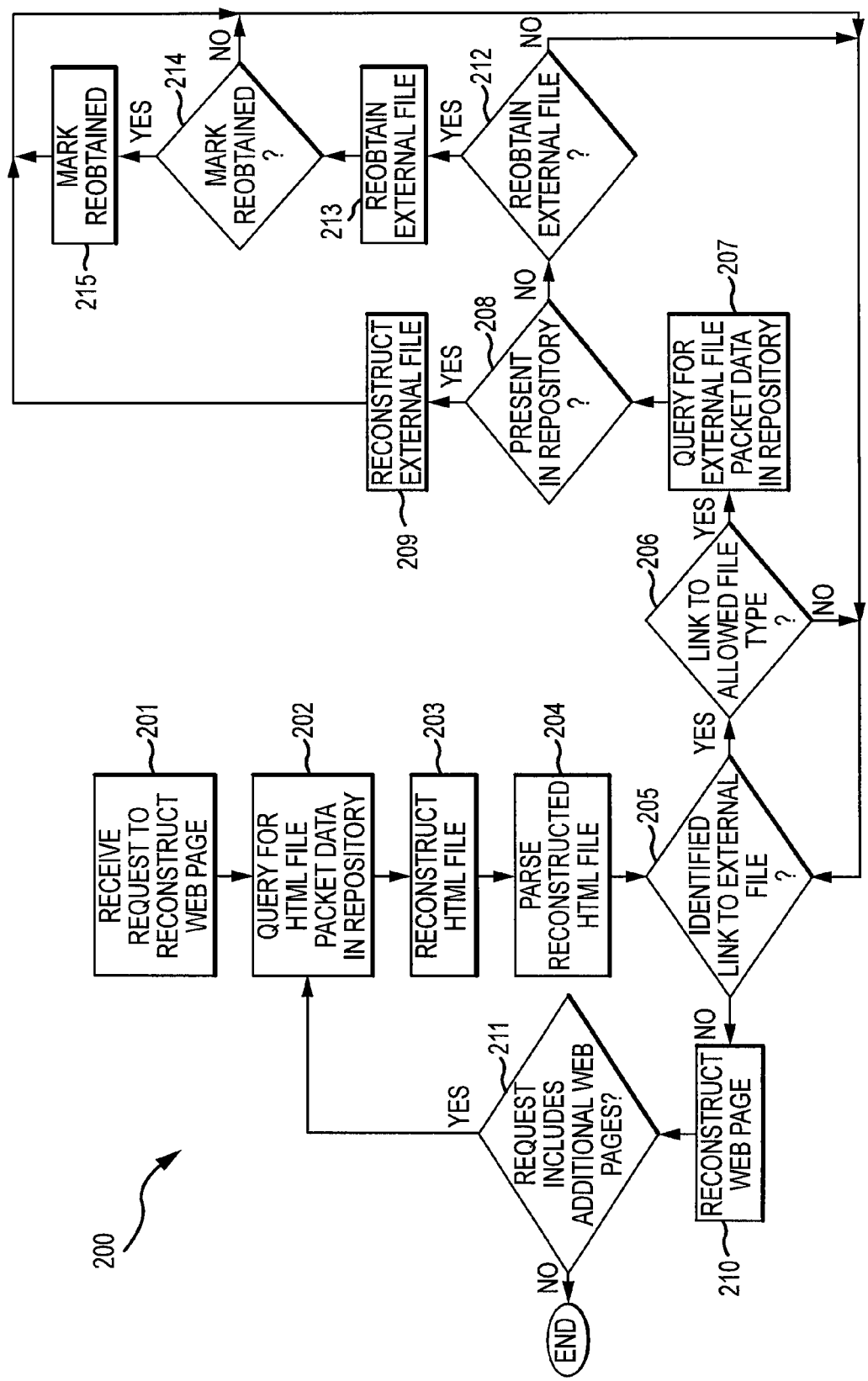
FIG. 2 is a flow chart that illustrates a sample method of hypertext transfer protocol layered reconstruction.

FIG. 2 illustrates a method 200 of hypertext transfer protocol layered reconstruction that may be performed by the system 100. In block 201, the HTML layered reconstruction module 103 receives a request to reconstruct a web page from network packet data stored in the packet capture repository and/or previously reconstructed artifacts. The request may specify a time window as well as file types to include, file types not to include, how to handle files that were not captured or are not to be included, and so on. The flow then proceeds to block 202.

At block 202, HTML layered reconstruction module 103 queries the indexing database 106 for locations of packet data stored in the packet capture repository and corresponding to the HTML file being reconstructed. The flow then proceeds to block 203 where the HTML layered reconstruction module reconstructs the HTML file from the packet data in the packet capture repository. Alternatively, the HTML layered reconstruction module may retrieve a previously reconstructed artifact of the HTML file. Next, the flow proceeds to block 204 where the HTML layered reconstruction module parses the reconstructed HTML file to identify any links to external references. The flow then proceeds to block 205.

At block 205, the HTML layered reconstruction module 103 identifies any links to external files that have not been processed. If the HTML layered reconstruction module identifies an unprocessed link to an file, the flow proceeds to block 206. If the HTML layered reconstruction module does not identify an unprocessed link to an file, the flow proceeds to block 210.

At block 206, the HTML layered reconstruction module 103 determines whether the link is associated with a file type that it is administratively allowed to include in the reconstructed web page. If the link is associated with a file type that is allowed to be included in the reconstructed web page, the flow proceeds to block 207. If the link is associated with a file type that is not allowed to be included in the reconstructed web page, the flow proceeds to block 205.

At block 207, the HTML layered reconstruction module 103 queries the indexing database 106 for locations of data for the file in the packet capture repository associated with the link. Alternatively, the layered reconstruction module may query a database to previously reconstructed artifacts. The flow then proceeds to block 208. At block 208, the HTML layered reconstruction module determines whether file or the data for the file associated with the link is present are a previously reconstructed artifact or as data in the packet capture repository. If neither the file nor the data is present, the flow proceeds to block 209. If the data is not present, the flow proceeds to block 212. At block 209, in the case where the file had not been previously reconstructed but where the data is present in the packet capture repository, the HTML layered reconstruction module reconstructs the file from the data and the flow proceeds to block 205.

At block 212, the HTML layered reconstruction module 103 determines whether to obtain a new version of the file utilizing the link. If the HTML layered reconstruction module determines to obtain a new version of the file, the flow proceeds to block 213. If the HTML layered reconstruction module determines not to obtain a new version of the file, the flow proceeds to block 205.

At block 213, the HTML layered reconstruction module 103 transforms the HTML file as needed, so as to cause the browser viewing the HTML file to retrieve a new version of the file and the flow proceeds to block 214. At block 214, the HTML layered reconstruction module determines whether to transform the HTML so that the reconstructed web page will indicate that the external file was reobtained rather than reconstructed from data in the packet capture repository or previously reconstructed artifacts. If the HTML layered reconstruction module determines to thus mark the reobtained file, the flow proceeds to block 215. If the HTML layered reconstruction module determines not to mark the reobtained file, the flow proceeds to block 205. At block 215, the HTML layered reconstruction module transforms the HTML file and the flow proceeds to block 205.

At block 210, the HTML layered reconstruction module 103 presents the reconstructed data to the analyst's/administrator's browser for viewing of the web page utilizing the reconstructed HTML file, any reconstructed external files, and/or any reobtained external files. The flow then proceeds to block 211 where the HTML layered reconstruction module determines whether the request specifies to reconstruct additional web pages. If the request specifies to reconstruct additional web pages, the flow proceeds to block 202. If the request does not specify to reconstruct additional web pages, the flow ends.

Details of performance of the method of FIG. 2 by the HTML layered reconstruction module 103 will now be further discussed with respect to the system 100. As discussed previously, the HTML layered reconstruction module may query the indexing database 106. The query may specify a HTML file that was previously transmitted over the network 107. The query may also specify a time window within which to restrict the query such that only network packet data captured during the time window (e.g., packets having time stamps falling within the time window and the like) is searched. The HTML layered reconstruction module may perform the query in response to receiving user input from a user interface 110 that is communicably coupled to the capture appliance 101.

The HTML layered reconstruction module 103 may query the indexing database to identify locations of, and retrieve, packet data of the HTML file in the packet capture repository. Based on the identified packet data, the HTML layered reconstruction module may reconstruct the HTML file and parse it to identify one or more links in the HTML file to external files (such as links to external image files, movie files, script files, style sheet files, and so on). Alternatively, the HTML layered reconstruction module may retrieve a previously reconstructed artifact of the HTML file. The HTML layered reconstruction module may determine whether data of external files associated with the links is stored in the packet capture repository or as a previously reconstructed artifact file. If the query for the HTML file specifies a time window, the determination whether the data is stored in the packet capture repository may be limited to that same time window (such as by comparing time stamps of the external packet data with the time window, comparing time stamps of the data with time stamps of the packet data of the HTML file, and so on). If data of files associated with the links is present in the packet capture repository, the HTML layered reconstruction module may then query the indexing database to identify locations of data in the packet capture repository and may reconstruct the files. The HTML layered reconstruction module may also query a database containing references to previously reconstructed artifact files. The HTML layered reconstruction module may then reconstruct the web page based at least on the reconstructed HTML file and reconstructed files.

If data of files associated with a particular link is determined not to be present neither in the packet capture repository, nor as a previously reconstructed artifact file, the reconstructed web page may not be recreated from a stored version of the files. The data may not be present in the packet capture repository or as a previously reconstructed artifact file for a variety of reasons. For example, the external file may have been loaded from cache rather than sent across the network when the web page was originally accessed. By way of another example, the external file may not have been available when the web page was originally accessed and thus was not a component of the web page as it was originally viewed by the respective user. An indication may be provided in the reconstructed web page if the reconstructed web page is not based on a reconstructed version of a particular external file, such as a missing image placeholder that illustrates that a particular image failed to load.

The query for the HTML file may specify to load a file from the original source specified by the particular link when the data is determined not to be present in the packet capture repository. In this case, the reconstructed web page may be based on an newly obtained version of the file in question rather than a version reconstructed from stored data. The reconstructed web page may show a visual indicator or play an audio indicator that illustrates that the file was newly obtained, such as displaying the rendered version of the file in the reconstructed web page with a red border or playing an alert noise when a cursor is rolled over the rendered version of the file.

The query for the HTML file may specify to reconstruct certain types of files associated with links in the HTML file in reconstructing the web page and not others. For example, the query may specify not to reconstruct script files from data stored in the packet capture repository because of concerns that script files may include viruses or other malicious code. Thus, when a link is identified in the HTML file that is associated with a script file, the HTML layered reconstruction module 103 may not reconstruct any file associated with the link for inclusion in the reconstructed web page. The specification in the query as to which types of files to use in reconstructing the web page may be based on user input received from the user interface 110.

Thus, because the HTML layered reconstruction module 103 can granularly tailor the reconstruction of the web page based on which file types to include, which file types not to include, whether to obtain new versions of files that do not have related previously reconstructed artifact files or data in the packet capture repository, whether to provide indications in the reconstructed web page for files retrieved from external sources, the HTML layered reconstruction module 103 provides flexible and layered reconstruction of web pages. An administrator may control the specifications of the query via the user interface 110 in order to control and visually detect just how much the reconstructed web site matches the original web site viewed by the user. At the same time, the administrator is able to restrict aspects that would present a closer reconstruction but would possibly endanger network resources.

Figure 3:
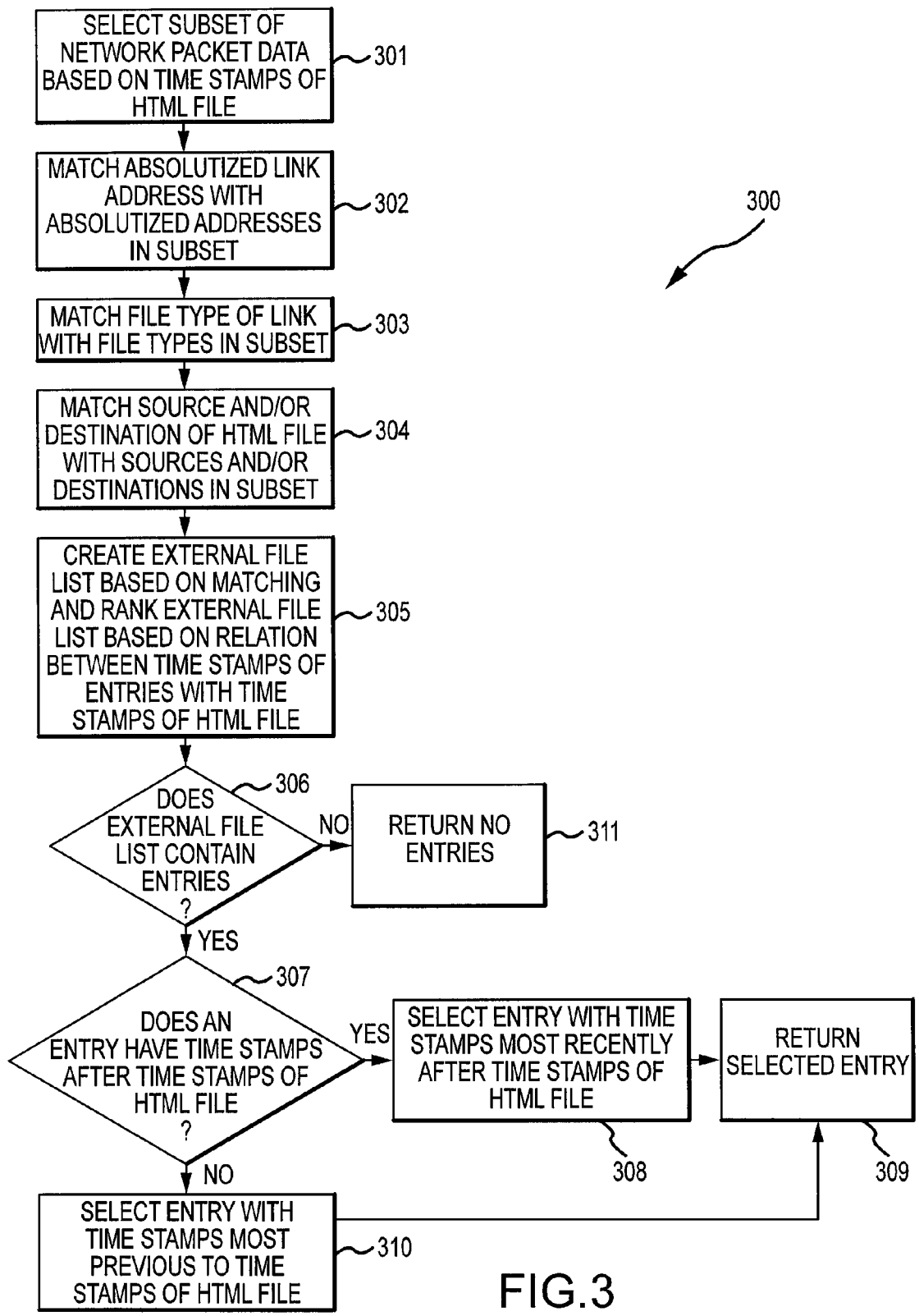
FIG. 3 is a flow chart that illustrates a sample method for determining whether or not external file packet data is present in the packet capture repository; this method may be performed as part of the method of FIG. 2.

As previously mentioned, the HTML layered reconstruction module 103 may determine whether a previously reconstructed artifact file or whether data of a file associated with a link is stored in the packet capture repository. FIG. 3 illustrates a method 300 of determining whether external file packet data is present in the packet capture repository. This method may be performed by the HTML layered reconstruction module as part of performing block 208 of the method of FIG. 2. In block 301, the HTML layered reconstruction module 103 selects a subset of the network packet data stored in the packet capture repository, based on time stamps associated with an HTML file. The flow then proceeds to block 302 where the HTML layered reconstruction module matches an absolutized version of a link with an absolutized version of addresses associated with the subset of the data. Next, the flow proceeds to block 303 where the HTML layered reconstruction module matches a file type associated with the link with file types associated with the subset of the data. Subsequently, the flow proceeds to block 304 where the HTML layered reconstruction module matches a source or destination address associated with the HTML file with a source or destination address associated with the subset of the data.

The flow then proceeds to block 305 where the HTML layered reconstruction module 103 creates a file list based on the matching performed in blocks 302-304 and ranks the list based on relations between time stamps associated with entries in the file list to time stamps associated with the HTML file. Next, the flow proceeds to block 306.

At block 306, the HTML layered reconstruction module 103 determines whether the file list contains any entries. If the file list does not include any entries, the flow proceeds to block 311 and the HTML layered reconstruction module returns no entries. If the file list includes entries, the flow proceeds to block 307.

At block 307, the HTML layered reconstruction module 103 determines whether the file list contains any entries associated with time stamps that are later in time than the time stamps associated with the HTML file. If so, the flow proceeds to block 308. Otherwise, the flow proceeds to block 310.

At block 308, the HTML layered reconstruction module 103 selects the entry from the file list that is associated with time stamps that are most recent in time yet after the time stamps associated with the HTML file. The flow then proceeds to block 309 where the HTML layered reconstruction module returns the selected entry.

At block 310, the HTML layered reconstruction module 103 selects the entry from the file list that is associated with time stamps that are most recent in time and prior to the time stamps associated with the HTML file. Then, the flow proceeds to block 309 where the process terminates.

Details of performance of the method of FIG. 3 by the HTML layered reconstruction module 103 will now be further discussed with respect to the system 100. As discussed previously, in performing the method of FIG. 3 the HTML layered reconstruction module may create a file list of possible matches of data in the packet capture repository that are associated with the link. To create the file list, the HTML layered reconstruction module may compare an absolutized version of the link with absolutized versions of addresses associated with data stored in the packet capture repository. Absolutizing is the conversion of any relative address to the corresponding absolute address. Additionally, the HTML layered reconstruction module may match a file type associated with the link to a file type associated with the data. Further, the HTML layered reconstruction module may match a source or destination address associated with the data to a source or destination address associated with the HTML file. The HTML layered reconstruction module may order the external file list to rank entries of possible matches of data in the packet capture repository. The entries may be ranked according to time stamps associated with the data, such as ranking the file list from most recent in time to latest in time. After creating the file list, the HTML layered reconstruction module 103 may select an entry and query the indexing database 106 for the data of that entry.

In some implementations, the HTML layered reconstruction module may select the entry that is associated with time stamps that fall soonest in time within a threshold (such as thirty seconds, five minutes, seven minutes, and so on) after time stamps associated with the HTML file. This entry may be selected as being potentially the most likely stored match for the file viewed with the original web page as it may have been captured shortly after the file may have been requested. In such implementations, if the external file list does not include an entry that is associated with time stamps that fall after time stamps associated with the HTML file, the HTML layered reconstruction module may select the entry that is associated with time stamps that fall soonest in time previous to time stamps associated with the HTML file. This entry may be less likely to be the stored match for the file viewed with the original web page, as it may have been captured prior to when that file may have been requested. However, this entry may be selected as likely to be similar to the file viewed with the original web page because it may have been captured shortly before the file was likely requested.

It should be understood that the external file reconstructed from the selected entry of the external file list in this manner may not be the actual file that was displayed on the web page when originally viewed by the user. Rather, the above process forms a "best guess." The process may be used, for example, when the stored data associated with the file in question was transmitted over the network before or after the time window, was obtained from cache rather than transmitted over the network, was not available when the user originally viewed the web page, and so on. The entry selected from the file list may instead relate to an file accessed by a second user utilizing the same link. The file in question may have changed between the time it was accessed by the first user (e.g., the user whose web site experience is being recreated) and the time it was accessed by the second user and stored. In any event, it is possible that the file utilized to reconstruct the web page may result in a different web page than that originally viewed by the user. Hence, the above process forms a "best guess" as to the file that was part of the web page as originally viewed by the user. A strictness setting in the HTML layered reconstruction module could enforce that only files reconstructed from sessions initiated by the original user be used in reconstruction process, or to provide visual or other indications of the inclusion of files from foreign sessions.

In addition to reconstructing the web page, the HTML layered reconstruction module 103 may provide the reconstructed web page to a user via the user interface 110. In various implementations, the HTML layered reconstruction module may implement a document object model (DOM) for reconstructing the web page, providing the reconstructed web page, and so on. Further, in some implementations, the HTML layered reconstruction module may generate a snapshot of the reconstructed web page and provide it to a user via the user interface. The provided snapshot may be selectable by the user in order to view the full reconstructed web page. Such a snapshot may be provided, optionally along with snapshots of other reconstructed web pages, so that the user may select particular reconstructed web pages for viewing.

Additionally, the HTML layered reconstruction module 103 may store the reconstructed HTML file and reconstructed external files on a storage medium, such as in a compressed file stored on disk. The HTML layered reconstruction module 103 may alter one or more references in the reconstructed HTML file and/or reconstructed external files to point to the storage medium instead of a network storage address. In this way, an administrator may be able to view a more complete version of the reconstructed web page without worrying that an active element of the reconstructed web page will perform malicious activity, such as downloading malicious code to the device viewing the HTML file.

Figure 4A:
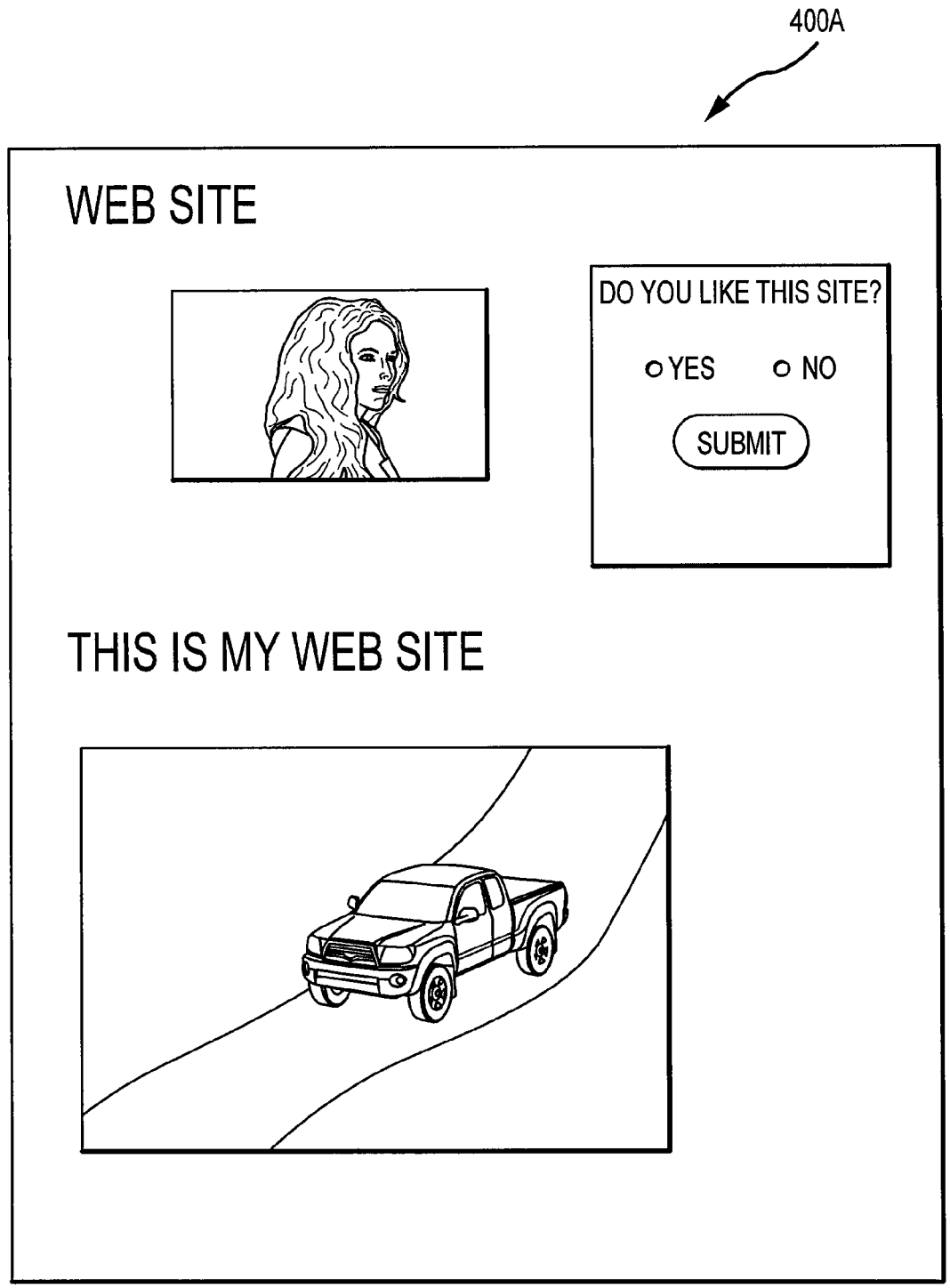
FIG. 4A illustrates a sample web page.

FIG. 4A depicts an example web page 400A as it was originally viewed by a user on a network. As illustrated, the example web site includes an image file of a person, a script file that generates a survey, a movie file of a truck driving on a road, and a style sheet file that controls the layout. If the HTML layered reconstruction module 103 reconstructed the example web page with reconstructed versions of the image file, the script file, the movie file, and the style sheet file, the reconstructed web page may appear as depicted in FIG. 4A. The reconstructed web page may also appear as depicted in FIG. 4A if one or more of the files are reobtained rather than reconstructed and the one or more files have not changed since the web site was originally viewed but the HTML layered reconstruction module does not visually indicate that the reobtained file was reobtained.

Figure 4B:
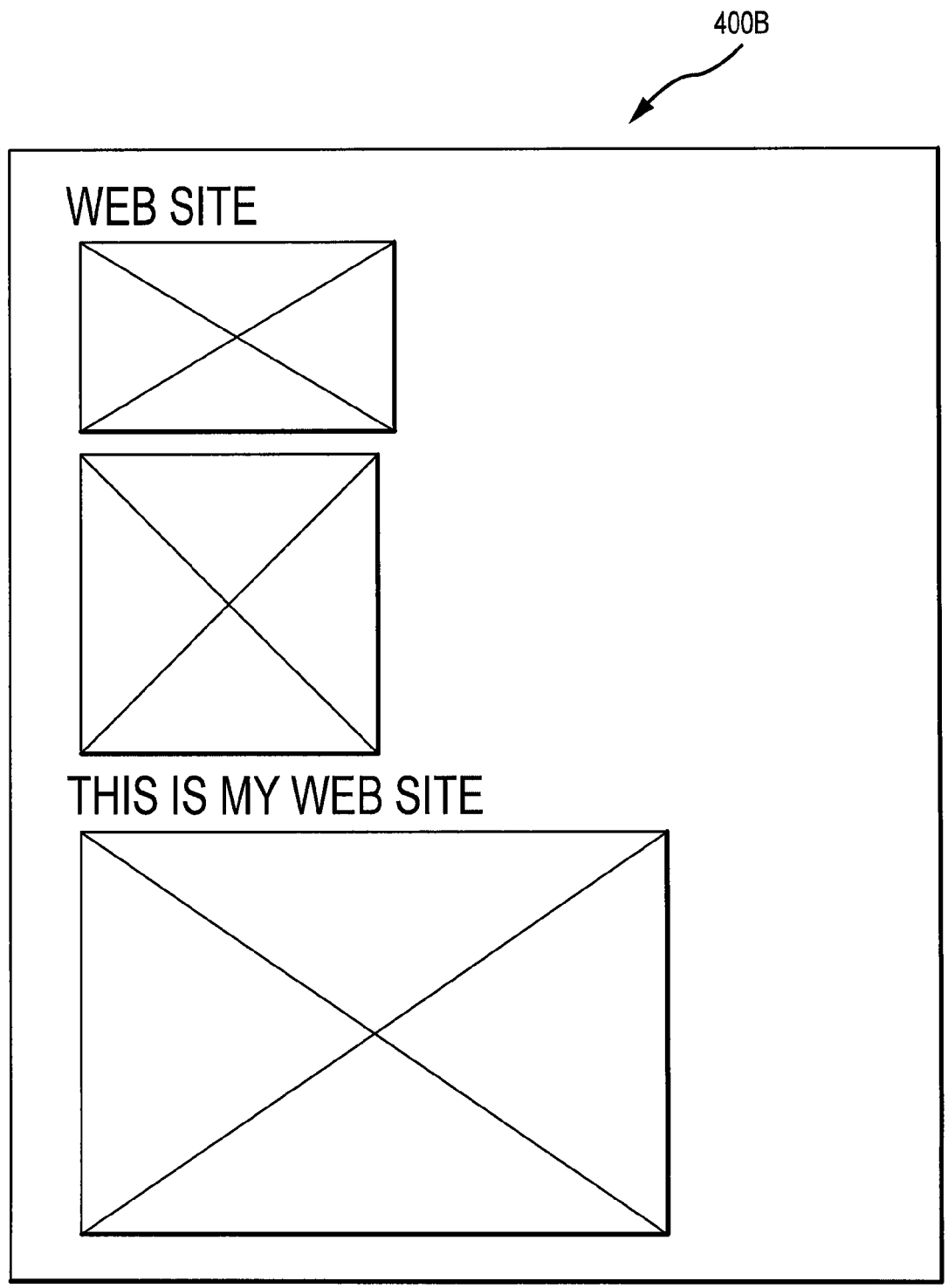
FIG. 4B illustrates the sample web page of FIG. 4A presented with an image, survey script, movie, and style sheet not loaded.

FIG. 4B depicts a reconstructed version 400B of the web page 400A that does not include the image file, the script file, the movie file, and the style sheet file. Thus, the reconstructed version of the web site only includes the reconstructed HTML file of the originally viewed web site. Missing file placeholders indicate that the image file, the script file, the movie file are missing. The layout is different from the example web page 400A as the style sheet file is not included. The HTML layered reconstruction module 103 may generate this reconstructed version of the web site if instructed not to include image files, script files, movie files, and style sheet files. Additionally, this reconstructed version of the web site may be generated by the HTML layered reconstruction module if external file packet data for the image file, the script file, the movie file, and the style sheet file are not contained within the packet capture repository or as a previously reconstructed artifact file and the HTML layered reconstruction module is instructed not to reobtain files.

Figure 4C:
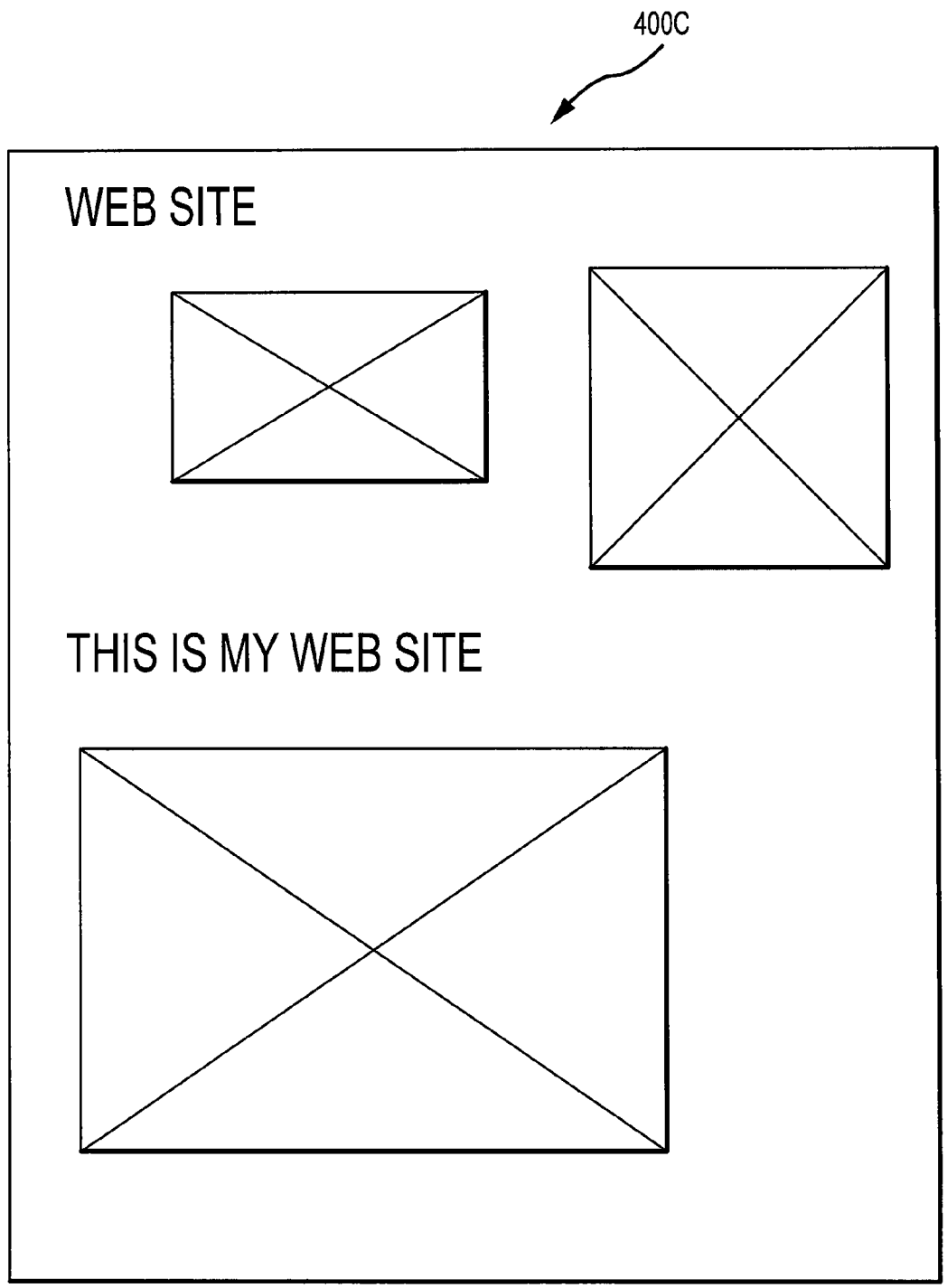
FIG. 4C illustrates the sample web page of FIG. 4A presented with an image, survey script, and movie not loaded.

FIG. 4C depicts a reconstructed version 400C of the web page 400A that does not include the image file, the script file, and the movie file. Thus, the reconstructed version of the web site includes the reconstructed HTML file of the originally viewed web site and the style sheet file. Missing file placeholders indicate that the image file, the script file, the movie file are missing. The HTML layered reconstruction module 103 may generate this reconstructed version of the web site if instructed not to include image files, script files, and movie files but is instructed to include style sheet files. Additionally, this reconstructed version of the web site may be generated by the HTML layered reconstruction module if external file packet data for the image file, the script file, and the movie file are not contained within the packet capture repository or as a previously reconstructed artifact file and the HTML layered reconstruction module is instructed not to reobtain files.

Figure 4D:
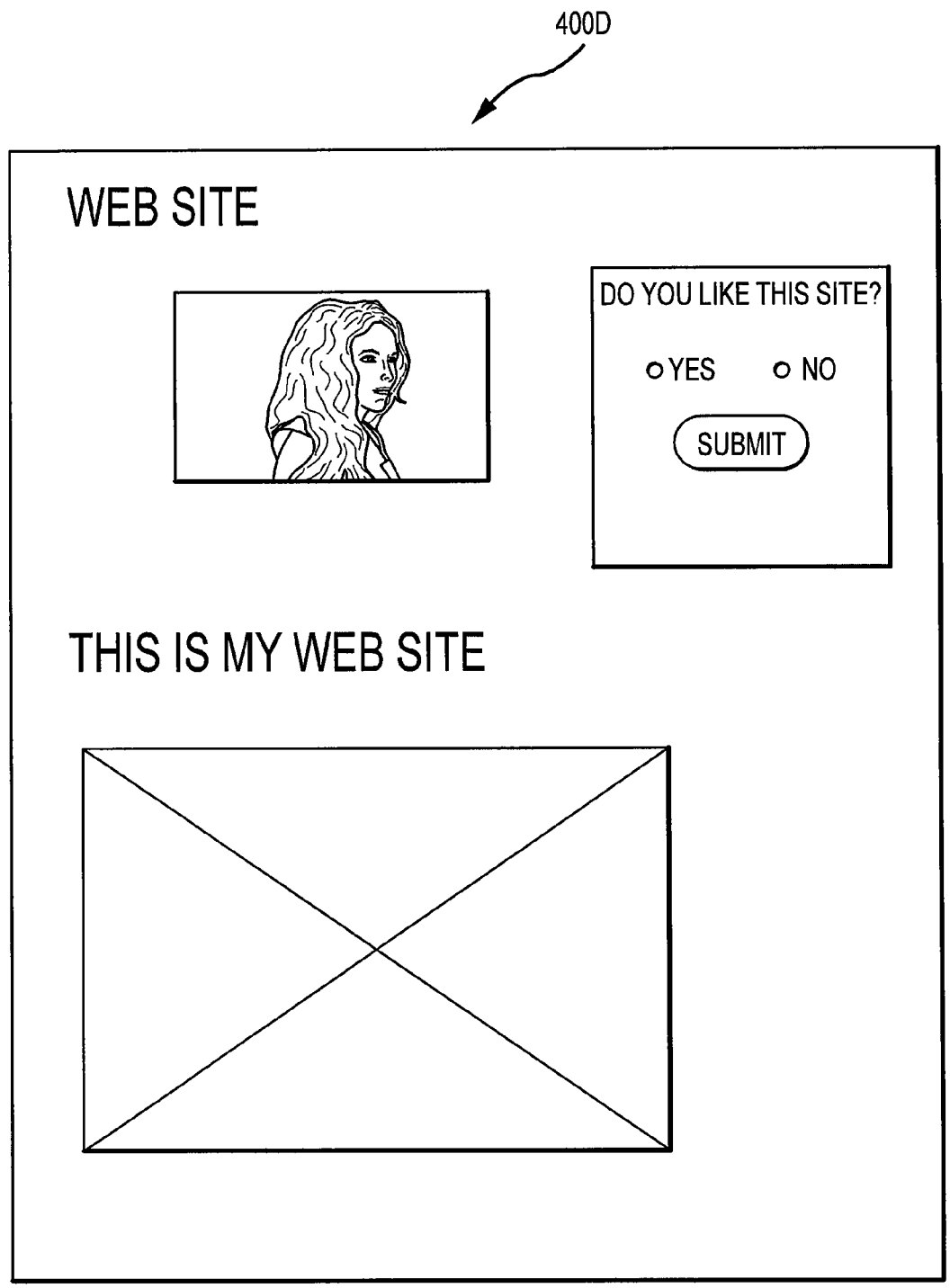
FIG. 4D illustrates the sample web page of FIG. 4A presented with a movie not loaded.

FIG. 4D depicts a reconstructed version 400D of the web page 400A that does not include the movie file. Thus, the reconstructed version of the web site includes the reconstructed HTML file of the originally viewed web site, the image file, the script file, and the style sheet file. A missing file placeholder indicates that the movie file is missing. The HTML layered reconstruction module 103 may generate this reconstructed version of the web site if instructed not to include movie files but is instructed to include image files, script files, and style sheet files. Additionally, this reconstructed version of the web site may be generated by the HTML layered reconstruction module if external file packet data for the movie file is not contained within the packet capture repository or as a previously reconstructed artifact file and the HTML layered reconstruction module is instructed not to reobtain files.

Figure 4E:
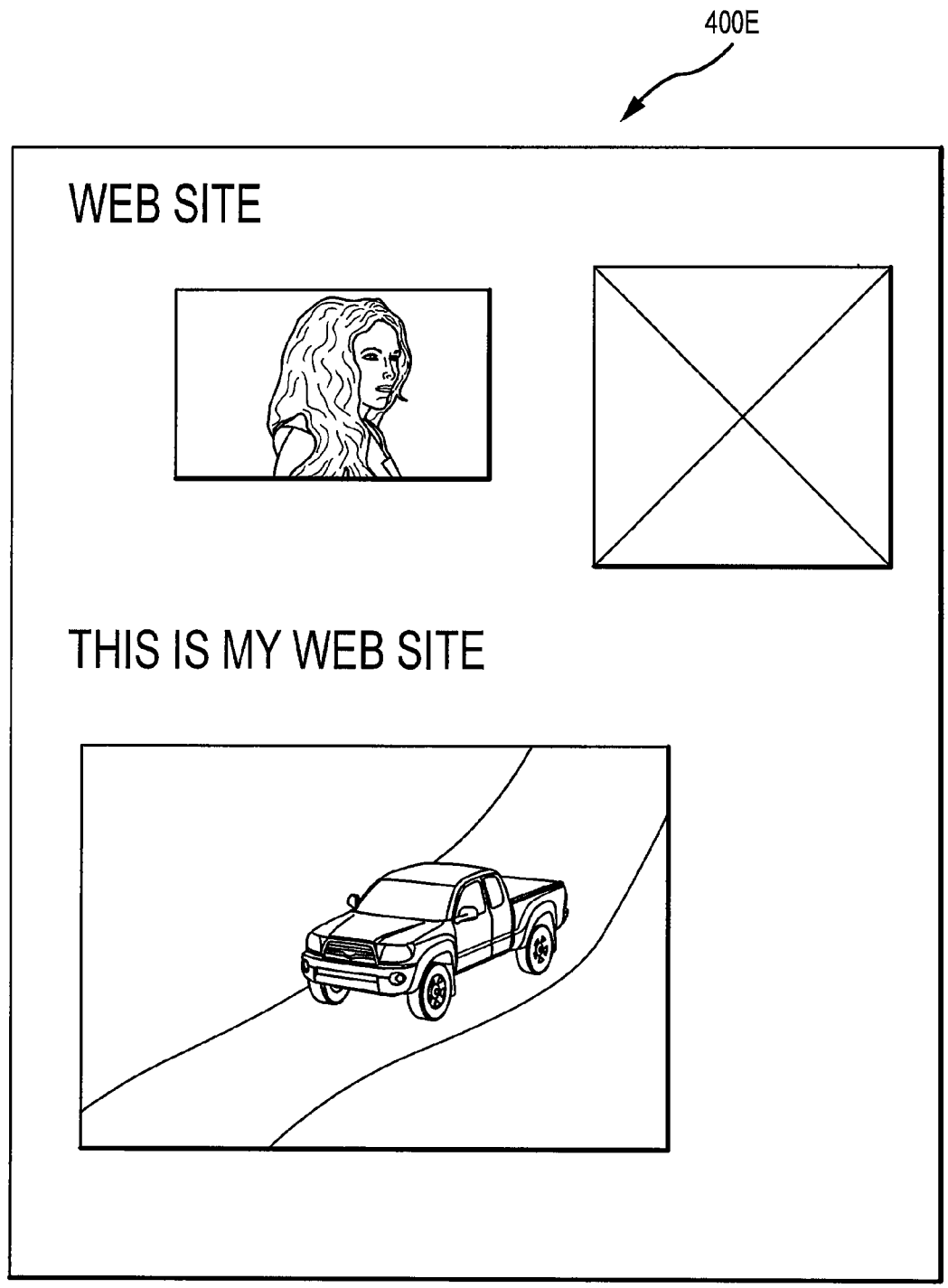
FIG. 4E illustrates the sample web page of FIG. 4A presented with a survey script not loaded.

FIG. 4E depicts a reconstructed version 400E of the web page 400A that does not include the script file. Thus, the reconstructed version of the web site includes the reconstructed HTML file of the originally viewed web site, the image file, the movie file, and the style sheet file. A missing file placeholder indicates that the script file is missing. The HTML layered reconstruction module 103 may generate this reconstructed version of the web site if instructed not to include script files but is instructed to include image files, movie files, and style sheet files. Additionally, this reconstructed version of the web site may be generated by the HTML layered reconstruction module if external file packet data for the script file is not contained within the packet capture repository or as a previously reconstructed artifact file and the HTML layered reconstruction module is instructed not to reobtain files.

Figure 4F:
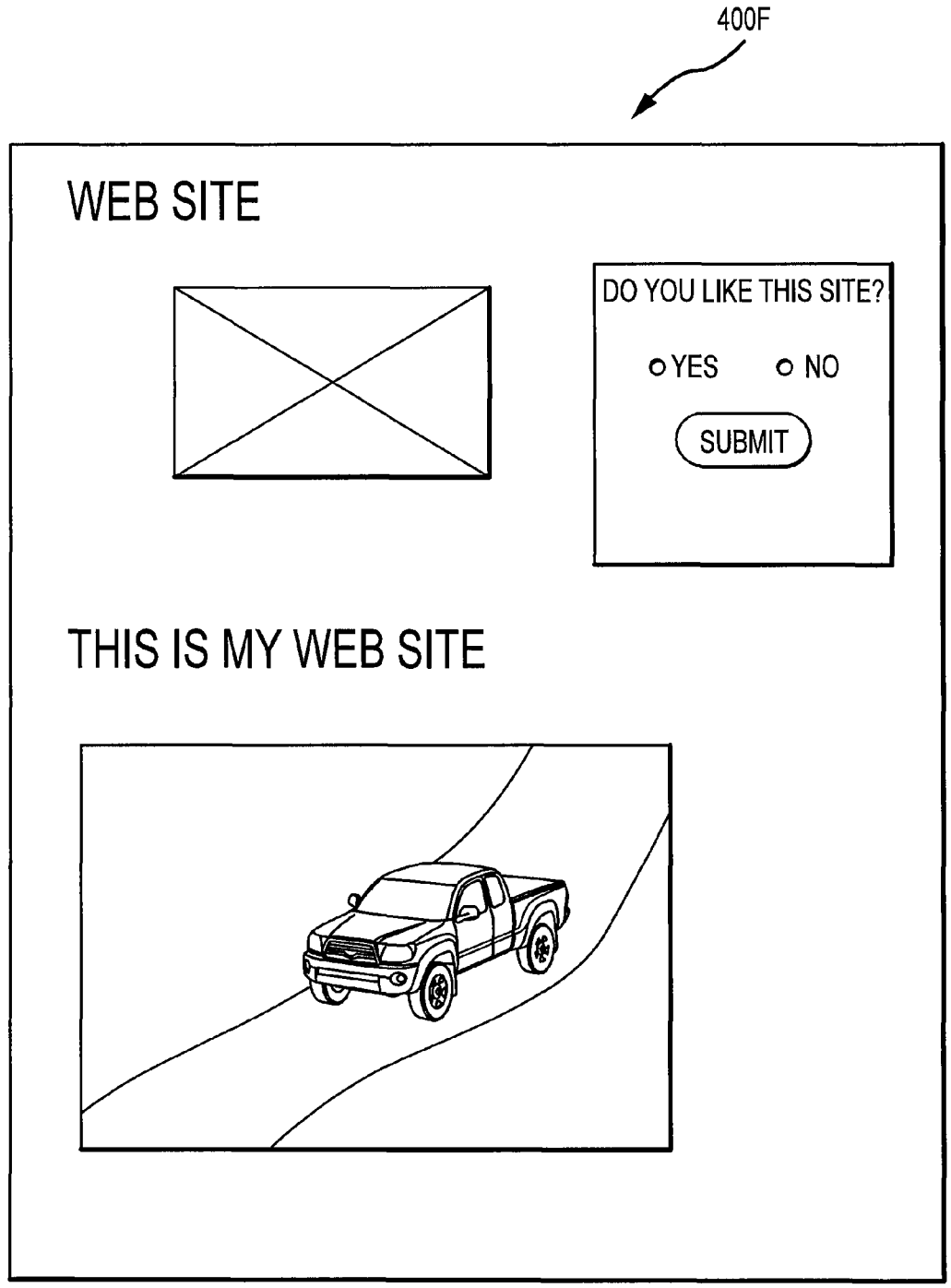
FIG. 4F illustrates the sample web page of FIG. 4A presented with an image not loaded.

FIG. 4F depicts a reconstructed version 400F of the web page 400A that does not include the image file. Thus, the reconstructed version of the web site includes the reconstructed HTML file of the originally viewed web site, the movie file, the script file, and the style sheet file. A missing file placeholder indicates that the image file is missing. The HTML layered reconstruction module 103 may generate this reconstructed version of the web site if instructed not to include image files but is instructed to include movie files, script files, and style sheet files. Additionally, this reconstructed version of the web site may be generated by the HTML layered reconstruction module if external file packet data for the image file is not contained within the packet capture repository or as a previously reconstructed artifact file and the HTML layered reconstruction module is instructed not to reobtain files.

Figure 4G:
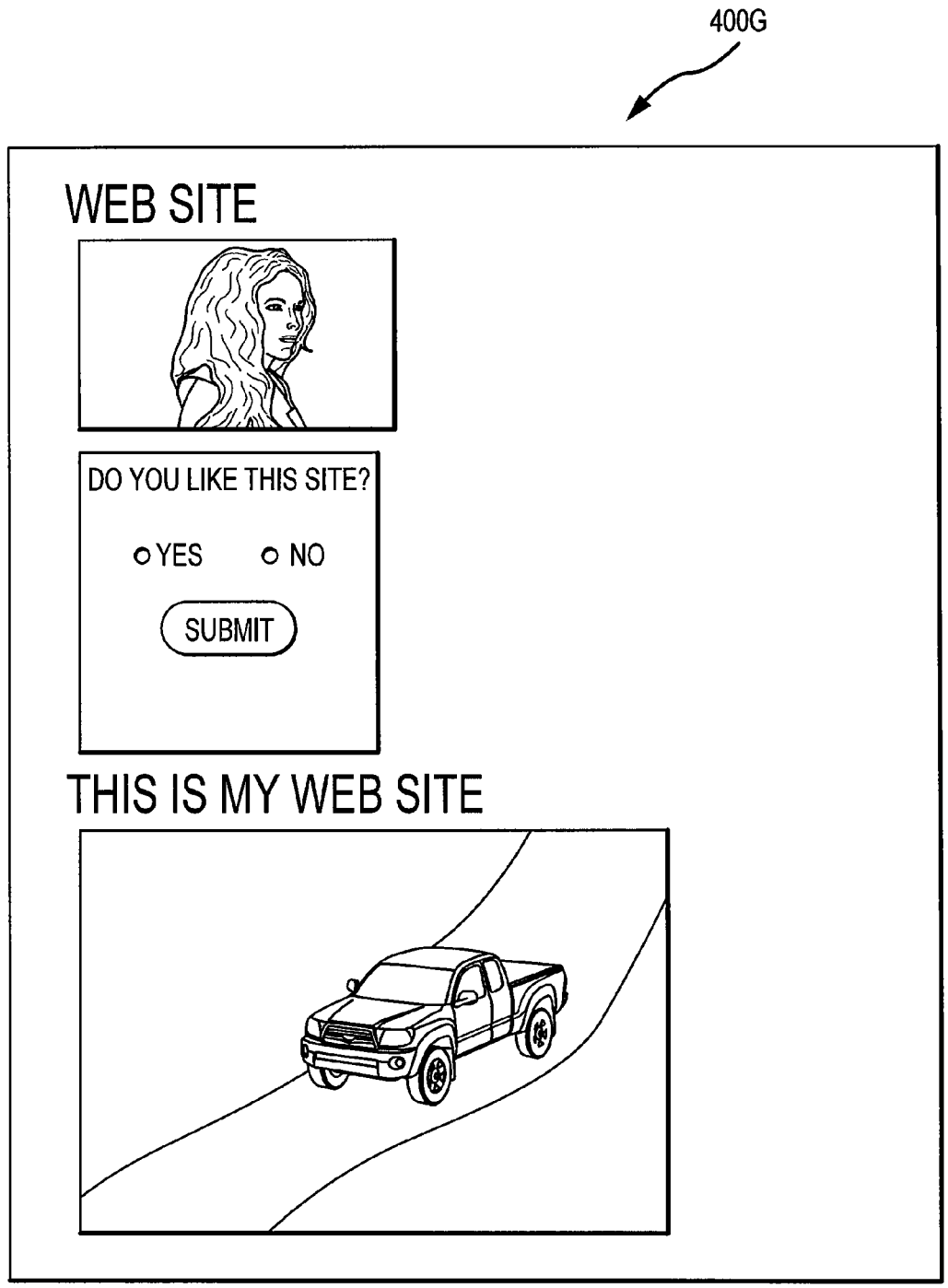
FIG. 4G illustrates the sample web page of FIG. 4A presented with a style sheet not loaded.

FIG. 4G depicts a reconstructed version 400G of the web page 400A that does not include the style sheet file. Thus, the reconstructed version of the web site includes the reconstructed HTML file of the originally viewed web site, the movie file, the script file, and the image file. The layout is different from the example web page 400A as the style sheet file is not included. The HTML layered reconstruction module 103 may generate this reconstructed version of the web site if instructed not to include style sheet files but is instructed to include movie files, script files, and image files. Additionally, this reconstructed version of the web site may be generated by the HTML layered reconstruction module if external file packet data for the style sheet file is not contained within the packet capture repository or as a previously reconstructed artifact file and the HTML layered reconstruction module is instructed not to reobtain files.

Figure 4H:
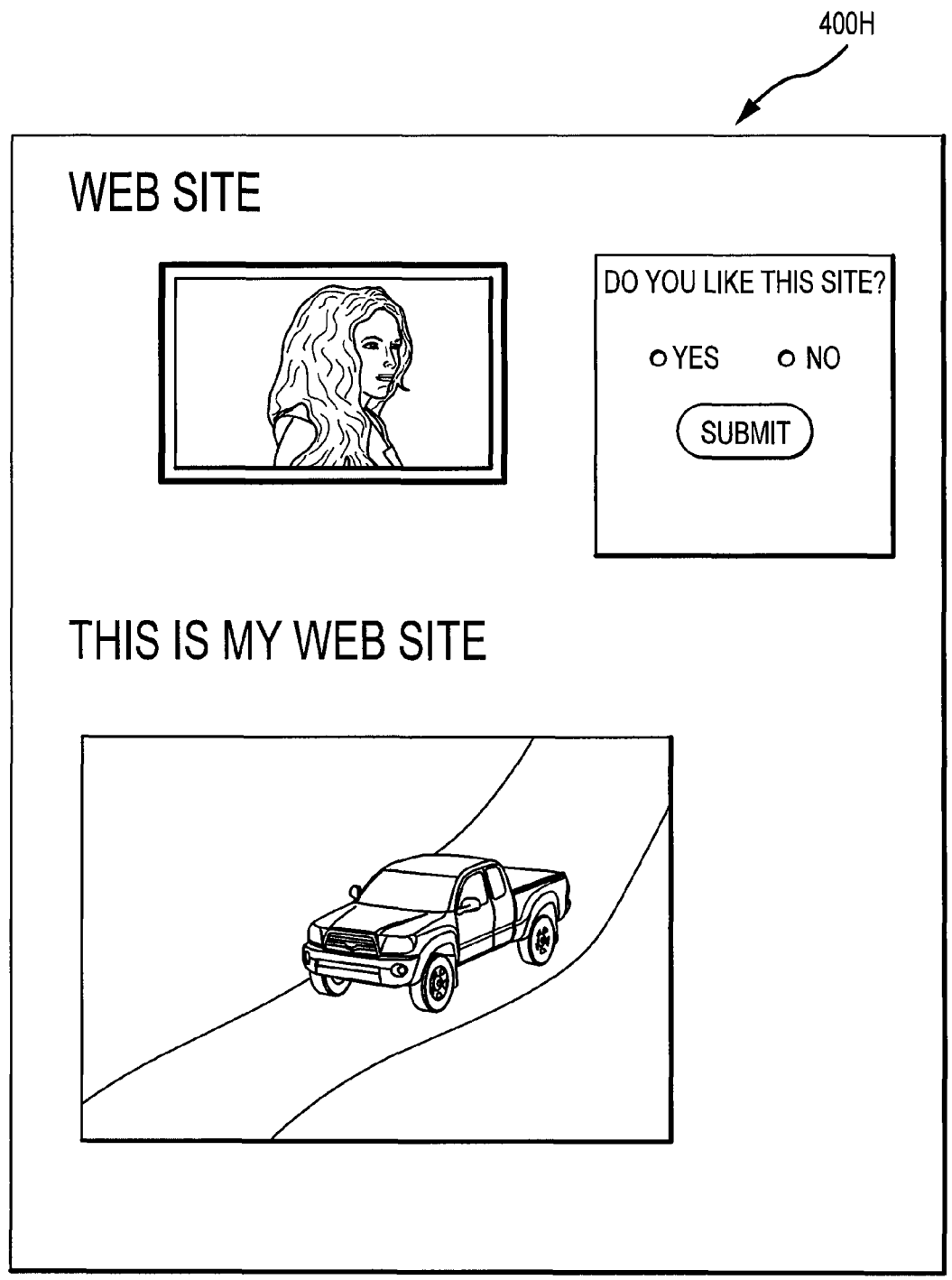
FIG. 4H illustrates the sample web page of FIG. 4A presented with a visual indicator indicating an image was obtained from an original source rather than captured data.

FIG. 4H depicts a reconstructed version 400H of the web page 400A that includes an extra border around the image file. Thus, the reconstructed version of the web site includes the reconstructed HTML file of the originally viewed web site, the image file, the movie file, the script file, and the style sheet file. The HTML layered reconstruction module 103 may generate this reconstructed version of the web site if external file packet data for the image file is not contained within the packet capture repository or as a previously reconstructed artifact file, the HTML layered reconstruction module is instructed to reobtain files and visually indicate any files that are reobtained, and the image file has not changed since the web site was originally viewed.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a: magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various implementations, it will be understood that these implementations are illustrative and that the scope of the disclosure is not limited to them. Many variations, modifications, additions, and improvements are possible. More generally, implementations in accordance with the present disclosure have been described in the context of particular embodiments. Functionality may be separated or combined in blocks differently in various embodiments of the disclosure or described with different terminology. These and other variations, modifications, additions, and improvements may fall within the scope of the disclosure as defined in the claims that follow.

The invention claimed is:

1. A method of hypertext transfer protocol layered reconstruction comprising:
 querying, utilizing at least one processing unit, at least one database to identify at least one of a location of packet data of a hypertext markup language file in a packet capture repository or a location of a previously reconstructed artifact of the hypertext markup language file, the packet capture repository storing network packet data, the database indexed by content analysis and inspection of the network packet data to point to at least one location of the network packet data in the packet capture repository according to at least one of artifact types of the network packet data, protocol types of the network packet data, or time stamps of the network packet data;
 selecting a subset of the network packet data based on the time stamps of the network packet data and time stamps of at least one of the packet data of the hypertext markup language file or the previously reconstructed artifact of the hypertext markup language file;
 identifying, utilizing the at least one processing unit, at least one external link in the hypertext markup language file;
 identifying, utilizing the at least one processing unit, at least one additional external link in the hypertext markup language file;
 querying, utilizing the at least one processing unit, the at least one database to determine that external file packet data of an additional external file associated with the at least one additional external link is not located in the packet capture repository and was not previously reconstructed;
 querying, utilizing the at least one processing unit, the at least one database to identify at least one of a location of external file packet data of an external file in the packet capture repository associated with the at least one external link or a location of a previously reconstructed artifact of the external file; and
 reconstructing, utilizing the at least one processing unit, a web page based on at least the hypertext markup language file and the external file, wherein reconstructing includes determining a first available external file type that the reconstructed web page can include and a second available external file type that the reconstructed web page cannot include to avoid potential network damage from malicious code, wherein a placeholder is used as a substitute for the second available external file type, wherein the reconstructed web page is based on a version of the additional external file obtained from the at least one additional external link instead of at least one of the packet capture repository or the previously reconstructed artifact of the external file.

2. The method of claim 1, wherein the reconstructed web page includes an indication that the additional external file was obtained from the at least one additional external link instead of at least one of the packet capture repository or the previously reconstructed artifact of the external file.

3. The method of claim 1, wherein the first available external file type and the second available external file type are determined based on input received from a user.

4. The method of claim 1, wherein the first available external file type is at least one of an image file type, a script file type, a style sheet file type, and a video file type.

5. The method of claim 1, wherein said querying, utilizing at least one processing unit, a database to identify a location of packet data of a hypertext markup language file in a packet capture repository or a location of a previously reconstructed artifact of the hypertext markup language file further comprises:
 selecting a subset of the database based on a time window; and
 performing the query on the subset of the database.

6. The method of claim 5, wherein the time window is based on input received from a user.

7. The method of claim 1, wherein said reconstructing, utilizing the at least one processing unit, a web page based on at least the hypertext markup language file and the external file further comprises:
- storing at least one of the packet data of the hypertext markup file or the previously reconstructed artifact of the hypertext markup language file and at least one of the external file packet data of the external file or the previously reconstructed artifact of the external file to at least one non-transitory computer readable storage medium; and
- altering at least one reference of the hypertext markup file and a reconstructed artifact of the external file to refer to the at least one non-transitory computer readable storage medium.

8. The method of claim 1, wherein the at least one processing unit utilizes a document object model to reconstruct the web page and provide the reconstructed web page to a user.

9. The method of claim 1, further comprising: creating an image of the reconstructed web page and providing the image of the reconstructed web page to a user.

10. A method of hypertext transfer protocol layered reconstruction comprising:
- querying, utilizing at least one processing unit, at least one database to identify at least one of a location of packet data of a hypertext markup language file in a packet capture repository or a location of a previously reconstructed artifact of the hypertext markup language file, the packet capture repository storing network packet data, the database indexed by content analysis and inspection of the network packet data to point to at least one location of the network packet data in the packet capture repository according to at least one of artifact types of the network packet data, protocol types of the network packet data, or time stamps of the network packet data, wherein querying includes:
  - selecting a subset of the network packet data based on the time stamps of the network packet data and time stamps of at least one of the packet data of the hypertext markup language file or the previously reconstructed artifact of the hypertext markup language file;
  - creating an external file list by at least one of matching an absolutized version of the at least one external link with absolutized versions of addresses of the subset of the network packet data, wherein absolutized versions of addresses are absolute addresses for corresponding relative addresses, matching an external file type associated with the at least one external link with the subset of the network packet data, or matching a source or destination address of at least one of the packet data of the hypertext markup language file or the previously reconstructed artifact of the hypertext markup language file with a source or destination address of the external file packet data of the external file;
  - ranking the external file list based on the time stamps of the subset of the network packet data; and
  - selecting an entry from the ranked external file list based on the time stamps of the at least one of the packet data of the hypertext markup language file or the previously reconstructed artifact of the hypertext markup language file to obtain a best guess as to the file that was part of the web page as originally viewed by a user;
- identifying, utilizing the at least one processing unit, at least one external link in the hypertext markup language file;
- querying, utilizing the at least one processing unit, the at least one database to identify at least one of a location of external file packet data of an external file in the packet capture repository associated with the at least one external link or a location of a previously reconstructed artifact of the external file; and
- reconstructing, utilizing the at least one processing unit, a web page based on at least the hypertext markup language file and the external file, wherein reconstructing includes determining a first available external file type that the reconstructed web page can include and a second available external file type that the reconstructed web page cannot include to avoid potential network damage from malicious code, wherein the first available external file type and the second available external file type are determined based on input received from a user.

11. The method of claim 10, wherein said selecting an entry from the ranked external file list based on the time stamps of the at least one of the packet data of the hypertext markup language file or the previously reconstructed artifact of the hypertext markup language file further comprises selecting the entry with a time stamp soonest in time within a threshold after the time stamps of the at least one of the packet data of the hypertext markup language file or the previously reconstructed artifact of the hypertext markup language file.

12. The system of claim 10, wherein said selecting an entry from the ranked external file list based on the time stamps of the at least one of the packet data of the hypertext markup language file or the previously reconstructed artifact of the hypertext markup language file further comprises:
- determining the ranked external file list does not include entries with time stamps after the time stamps of the at least one of the packet data of the hypertext markup language file or the previously reconstructed artifact of the hypertext markup language file; and
- selecting the entry with the time stamp soonest in time previous to the time stamps of the at least one of the packet data of the hypertext markup language file or the previously reconstructed artifact of the hypertext markup language file.

* * * * *